United States Patent [19]

Bendler

[11] 4,152,645
[45] May 1, 1979

[54] METHOD AND APPARATUS FOR PRODUCING AN ANALOGUE OUTPUT PROPORTIONAL TO ROTATIONAL SPEED EMPLOYING DIGITAL TO ANALOGUE CONVERSION

[75] Inventor: Robert K. Bendler, Mountain View, Calif.

[73] Assignee: Acurex Corporation, Mountain View, Calif.

[21] Appl. No.: 800,888

[22] Filed: May 26, 1977

[51] Int. Cl.² .............................................. G01P 3/44
[52] U.S. Cl. .................................. 324/163; 324/179; 324/186; 340/347 AD; 364/565
[58] Field of Search ............... 324/160, 163, 166, 173, 324/174-175, 178, 179, 181, 186; 364/565; 340/347 AD

[56] References Cited
U.S. PATENT DOCUMENTS 3,729,989  5/1973  Little ..................................... 324/169
3,935,537  1/1976  Batchelor ............................. 324/166

OTHER PUBLICATIONS

Harrison, T. J.; Logarithmic D/A Converter; IBM Tech. Bull.; vol. 5, No. 5; Oct. 1962; pp. 30-31.

Primary Examiner—Robert J. Corcoran
Attorney, Agent, or Firm—Flehr, Hohbach, Test

[57] ABSTRACT

A system and method for measuring the rotational speed of a variable speed drive shaft for a ship or the like with high accuracy over a wide range of speeds. Means associated with the shaft sense the time interval for each turn of the shaft, or fraction thereof. Such time interval is accurately measured and then converted to an r.p.m. value. Steps in the method include counting the number of cycles of an oscillating signal in binary form to measure the time interval for each turn, selecting a most significant portion of bits within the number counted, determining the positional weight of the most significant bit to obtain a scaling factor, and producing a voltage inversely proportional to the value of the selected portion of bits, which voltage is then scaled by the scaling factor.

17 Claims, 4 Drawing Figures

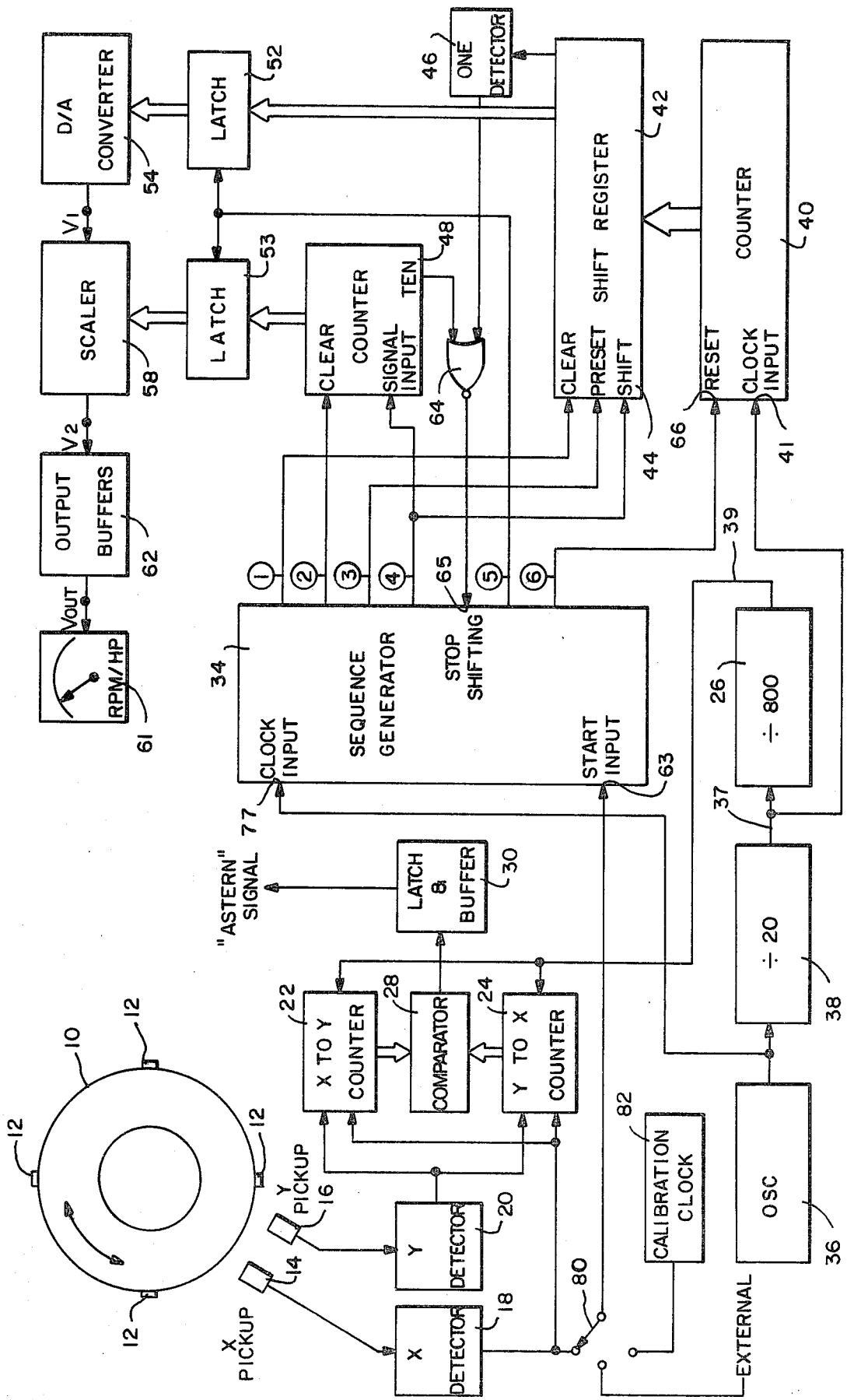
FIG.—1

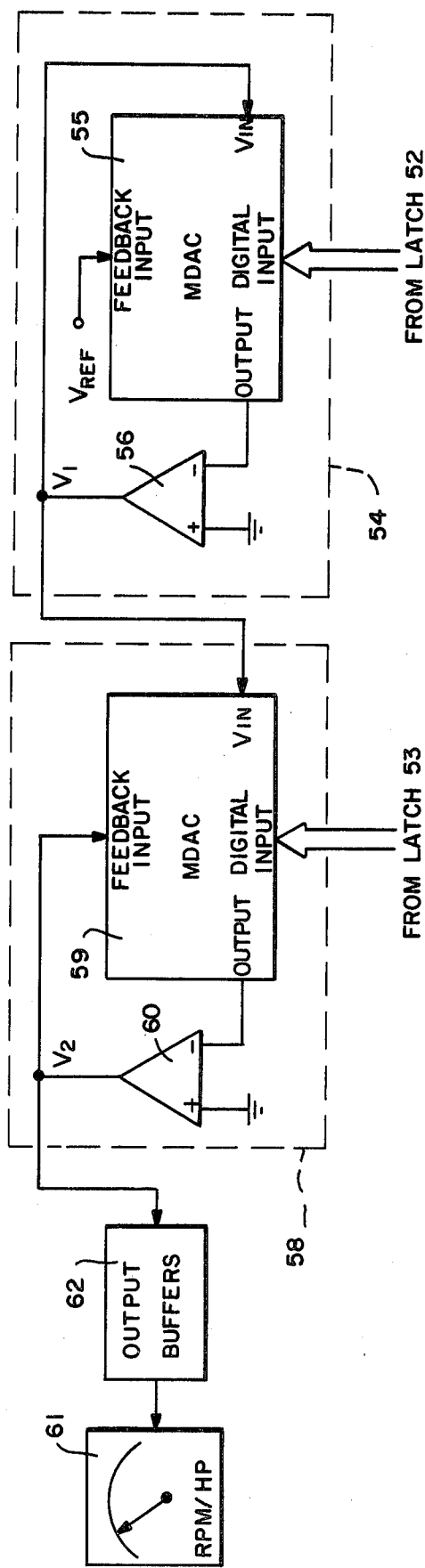
FIG.—2
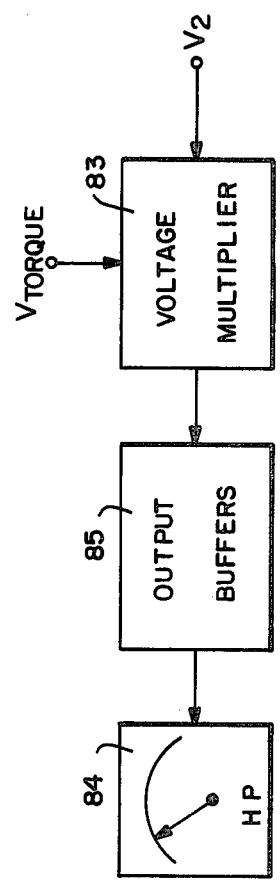
FIG.—4

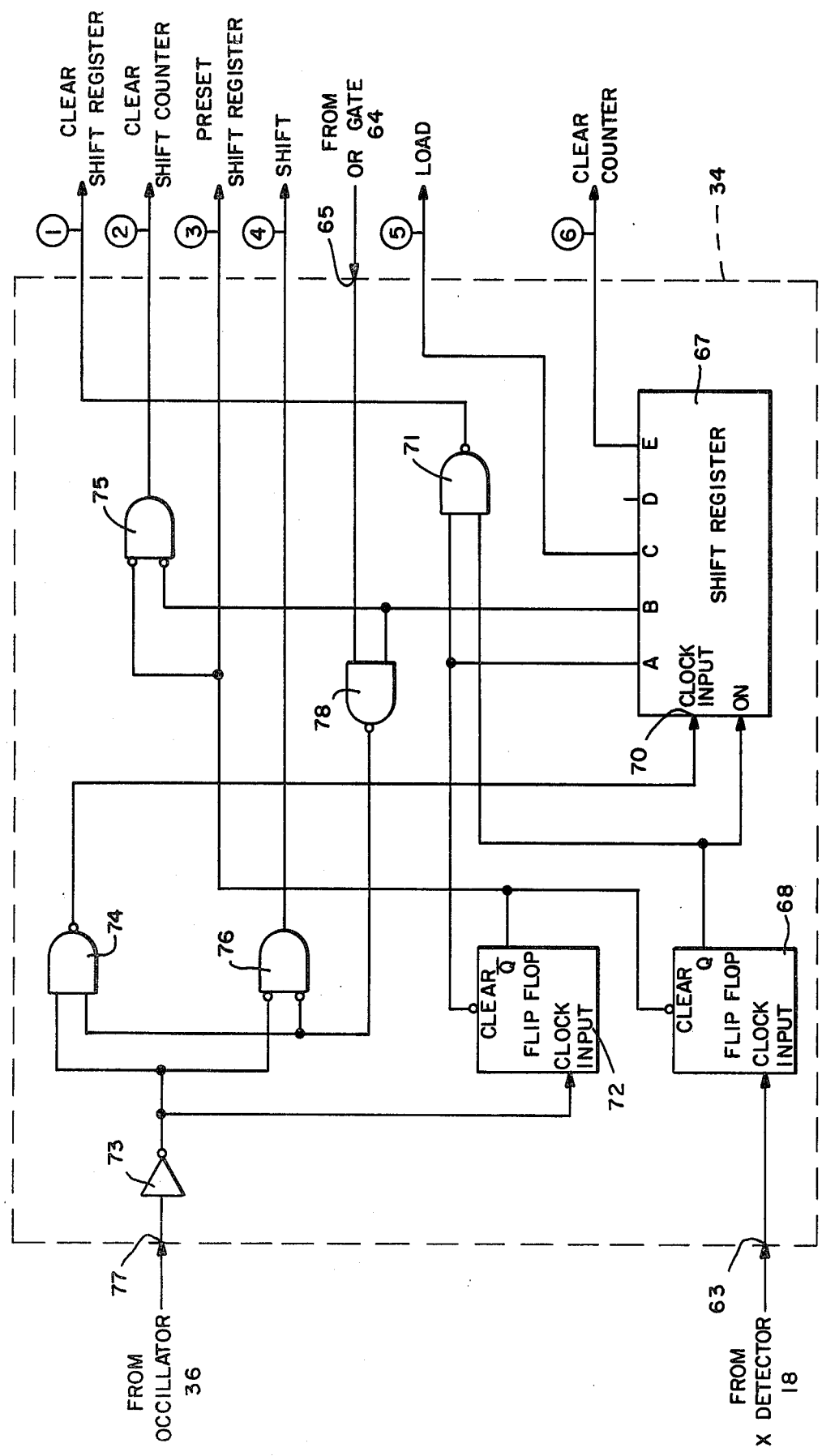
FIG.—3

METHOD AND APPARATUS FOR PRODUCING AN ANALOGUE OUTPUT PROPORTIONAL TO ROTATIONAL SPEED EMPLOYING DIGITAL TO ANALOGUE CONVERSION

BACKGROUND OF THE INVENTION

The present invention is directed to an apparatus and method for producing an analog output proportional to the rotational speed of a shaft.

An analog measure of shaft rotational speed is useful in its raw form and also as an analog input for calculating other mechanical system parameters such as horsepower. In marine applications such analog system data is particularly useful in realizing maximum efficiency from a new generation of ships having variable pitch propellers. To obtain shaft horsepower it is necessary to know the values of torque and shaft speed. Apparatus for producing an analog output proportional to shaft torque is disclosed in U.S. Pat. No. 3,850,030, assigned to the present assignee.

Shaft speed measuring systems employing a direct mechanical connection between a shaft and monitoring gauge are expensive to install and calibrate, subject to constant wear, and are dependent on the accuracy of the mechanical gauge.

Electronic systems of measurement face the problem of the wide range of operating speeds encountered for ship driveshafts. Analog systems which measure partial or full shaft rotations or measure rotation time intervals are unworkable when the measured speeds range from less than one to over 100 r.p.m. Although digital computation devices will accurately handle such a wide range of values, analog devices do not due to inaccuracies in the analog multipliers used to calculate r.p.m.

Multiplying digital-to-analog converters (MDACs) would offer more accuracy in producing analog output values from digitally timed shaft rotation intervals, but they have a limited useful input range. A ten-bit MDAC can accept digital inputs between decimal values of 1 and 1023 only, and even this limited range cannot be fully utilized. Digital inputs at the lower end of the range contain too few significant bits to provide the high accuracy analog r.p.m. output desired. The operating range of a ship's driveshaft greatly exceeds the useful input range of such a converter.

Multiplying digital-to-analog converters having capacities exceeding ten bits are not readily available. Moreover, even converters accepting 11, 12 or more bits will fail to handle adequately the full range of speeds encountered in a ship's driveshaft.

OBJECTS AND SUMMARY OF THE INVENTION

It is an object of the invention to provide a system and method for producing an analog output proportional to the rotational speed of a variable speed shaft.

Another object of the invention is to provide such a system and method wherein measurement resolution and accuracy remain substantially constant over the entire range of anticipated shaft speeds.

Still another object of the invention is to provide an analog output proportional to shaft rotational speed which can be combined with an analog voltage proportional to torque to produce an analog voltage proportional to shaft horsepower.

In accordance with the foregoing objects, there is provided a system for measuring the rotational speed of a variable speed shaft. Means associated with the shaft sense at least a predetermined fractional rotation of the shaft. An oscillating signal of a predetermined frequency is provided. A counter having a capacity of a predetermined quantity of bits is responsive to the aforementioned sensing means so as to count the total number of cycles of the oscillating signal within the time interval of the predetermined fractional rotation of the shaft. Means are provided for selecting a most significant portion of the bits in the counter and such means also include means for sensing the positional weight of the most significant bit. The selected portion of bits is then supplied to a digital digital-to-analog converter circuit which is also responsive to the sensed positional weight of the most significant bit to produce an analog output proportional to shaft speed. Steps in the method include causing the digital counter to count the number of cycles produced by the oscillator during a predetermined fractional rotation of the shaft, selecting a most significant portion of the bits in the counter, sensing the positional weight of the most significant bit, and converting the portion of bits selected and the sensed positional weight of the most significant bit into an analog measure of shaft rotational speed.

BRIEF DESCRIPTION OF THE DRAWINGS

FIG. 1 is a schematic block diagram of the invention.

FIG. 2 is a more detailed block diagram of an output portion of FIG. 1.

FIG. 3 is a more detailed block diagram of the sequence generator shown in FIG. 1.

FIG. 4 is a block diagram of an alternative embodiment of the output portion of FIG. 2.

DETAILED DESCRIPTION OF THE PREFERRED EMBODIMENT

Referring to FIG. 1, the apparatus of the invention generally employs means for sensing rotation of a shaft and means for timing the rotation intervals. The latter means employs an oscillator supplying clock pulses and a pulse counter. Once a digital count proportional to the time interval of rotation is obtained the value is converted to analog form using the method of the invention described below.

To sense the rotation of shaft 10, four tangs 12 are positioned at equal intervals around the periphery. The number of tangs is not critical. If only one is used, full rotations are measured, otherwise only a predetermined fractional rotation is measured. The tangs serve to trigger X and Y pickups 14 and 16, which are of a magnetic type. Tangs 12 are made pf a ferrous material which when moved past the pickups in close proximity induce a varying current. The current from each pickup X and Y is monitored by detectors 18 and 20 respectively. The detectors integrate the signals received. When a signal from either pickup reaches a predetermined integrated value, the corresponding detector emits a pulse. Since four tangs are employed, a pulse is emitted from each detector every quarter turn of shaft 10.

Only a signal pickup and detector is used to time the intervals between pulses, with the second pickup serving to establish the direction of rotation of the shaft. To accomplish the latter the pulses from detectors X and Y are used to trigger a pair of counters 22 and 24. The counters record clock pulses from signal frequency divider 26, the operation of which is more fully described below. Counter 22 counts clock pulses from a tang 12 passing pickup X to a tang passing pickup Y and counter 24 counts the clock pulses from a tang passing pickup Y to a tang passing pickup X. The counts during the two intervals are then fed into comparator 28 with the largest count determining the direction of shaft rotation.

In marine applications comparator 28 most conveniently outputs a positive signal if the direction of rotation is that which will drive the ship astern. The output is fed to an appropriate latch and buffer 30 to drive an "astern" signal such as a panel light. The output could alternatively change the polarity of the final analog r.p.m. signal.

Means for digitally timing predetermined fractional rotations of shaft 10 such as the quarter-turns between tangs 12 require only a single pickup. The X pickup is used for that purpose with the pulses from X detector 18 being used to control the starting and periodic resetting of a digital counter. Clock pulses for measuring shaft speed are supplied to the clock input 41 of counter 40 by oscillator 36 as reduced in frequency by frequency divider 38. Together they form means for supplying an oscillating signal of a predetermined frequency. Oscillator 36 produces a signal of 128 KHz, and frequency divider 38 produces an output frequency of 6400 Hz at output terminal 37. A suitable counter set to pass only every 20th pulse from oscillator 36 may be used for divider 38. A second frequency divider 26 further reduces the frequency of the signal by a factor of 800 and drives counters 22 and 24 from its output terminal 39. Divider 26 provides an output frequency of 8 Hz. Oscillator 36 and dividers 38 and 26 respectively provide fast, medium, and slow clock pulses used in various parts of the system.

The frequencies used for the medium and slow clocks are based on several factors including the size of the measuring counter, the operating range of the shaft, and the number of tangs employed. In the preferred embodiment a counter 40 having a predetermined capacity of twenty bits is used to count the pulses arriving at clock input 41 from output terminal 37 of divider 38. The clock frequency of 6400 Hz will prevent overflow of the counter during the longest anticipated time intervals to be measured. The low frequency output of slow clock 26 is sufficient for the low resolution purposes of determining the direction of rotation.

Counter 40 is responsive to a tang pasing the X-pickup and counts the clock pulses from divider 38 during each quarter-turn of shaft 10. When a quarter-turn of shaft 10 is complete the accumulated number in counter 40 is converted to an analog measure of shaft speed. The conversion process includes a sequence of steps whereby only the most significant ten bits in counter 40 are fed into a digital-to-analog converter.

The sequence of steps converting the bits in binary counter means 40 to analog form include several steps in the method of the invention. In essence the method of the invention selects only the most significant bits from a counter which accomodates a larger number of bits than can be input into a digital-to-analog converter. Only the selected bits are supplied to the converter. The positional location of the most significant bit in the counter is also determined so that the positional weight, or actual magnitude, of the selected portion is known. Because the most appropriate range of bits is always fed into the digital-to-analog converter the process can be broadly defined as autoranging.

Apparatus for accomplishing the above method of analog conversion include a twenty-bit shift register 42. Shift register 42 is of a type well known in the art into which bits may be initially transferred from counter 40 and then shifted from their initial positions to positions of higher significance in increments of one positional location. A single such incremental shift occurs each time a "shift" command is sent to input 44. The shift commands are repeated until the most significant bit of the original number reaches a predetermined positional location in the shift register. A "one" detector 46 continuously monitors the most significant location in the shift register to determine when that location contains a 1. When a "shift" command brings a 1 to that location, shifting is stopped. Shift counting means 48 keeps track of the number of "shift" commands given and thereby monitors the number of incremental shifts accomplished during the conversion sequence. The entire shifting process serves to bring the ten most significant bits to the ten most significant locations in shift register 42. Those ten bits can then be readily isolated by transferring them into storage means such as latch 52. Likewise, the number of shifts in counter 48 is transferred to latch 53. It is the values stored in these latches which ultimately drive the digital-to-analog converters.

The analog output circuitry providing means for converting the selected ten bits to analog form and for scaling the result based on the sensed positional weight of the most significant bit is shown in greater detail in FIG. 2. The first converter is a 10-bit digital-to-analog converter 54 which is driven by the digital number stored in latch 52. First converter 54 employs a resistance network installed in the feedback loop of an operational amplifier 56. As is well known to those skilled in the art, such a circuit configuration provides an inverse transfer function with the analog output varying inversely with the digital values input. Such a transfer function is appropriate for calculating shaft speed since a short time for a rotation interval corresponds with a high shaft speed, and vice versa. The resistance network 55 employed in the preferred embodiment is a type such as the AD 7520 Multiplying Digital-To-Analog Converter (MDAC) manufactured by Analog Devices of Norwood, Massachusetts. When a straight analog output proportional to shaft speed is desired, the feedback input is fixed at a value designated $V_{ref}$ and the analog input $V_{in}$ is tied to the output V1 of operational amplifier 56. The analog voltage V1 is inversely proportional to the number value of the ten most significant bits in counter 40.

Voltage V1 is then scaled by a factor proportional to the positional weight of those ten most significant bits. That weight is proportional to the number stored in latch 53. Scaling means 58 employs another MDAC circuit 59 such as the AD 7520 connected in its normal multiplying configuration with operational amplifier 60. Amplifier output voltage V2 is connected to the feedback input of the resistance network and V1 provides the analog input. Scaler 58 adjusts V1 by a factor proportional to the digital input from latch 53 to produce V2.

In the preferred embodiment V2 is employed to drive indicating meter 61 after passing through output buffers 62. Buffers 62 should be adapted to meet the needs of the particular installation. For example, if long distances between scaler 58 and meter 61 are involved, the analog voltage V2 is preferably converted to an analog current value by buffer 62 to minimize signal degradation.

A series of commands produced by sequence generator 34 control the autoranging process. The commands are identified in FIG. 1 by encircled numbers 1 through 6. Each command is given in order of its encircled identifying number and they proceed sequentially down the right side of box 34. The commands are given approximately at the frequency of oscillator 36 which is used to drive the sequence generator. Briefly the commands are as follows: On receipt of a pulse from X detector 18 at start input 63, sequence generator 34 first clears shift register 42 and, secondly, clears counter 48. The third command presets shift register 42 to correspond to the number in counter 40. The shifting process in shift register 42 begins with the 4th command, which signals shift input 44. Each SHIFT signal is also recorded by counter 48. SHIFT signals are repeated until either a one appears in the most significant location, which causes detector 46 to output a stop signal, or ten shifts are accomplished. If the latter occurs, counter 48 outputs a similar stop signal. Either stop signal triggers OR gate 64 which inputs a "stop shifting" command at input 65 of the sequence generator. This stops any further SHIFT commands and triggers the fifth command which transfers the numbers in shift register 42 and counter 48 into latches 52 and 53, respectively. Finally, a sixth command is sent to input 66 of counter 40 to reset the counter to zero and begin a new measurement cycle.

Referring to FIG. 3, sequence generator 34 is actuated by a pulse from X detector 18 which enters input 63 to initiate generation of the command sequence. The start pulse reaching flip flop 68 causes its Q output to go high, turning on shift register 67. Shift register 67 is of a conventional type well known in the art adapted to produce positive output signals at terminals A-E in sequence upon receiving input signals at clock input 70. After being turned on by flip-flop 68, the first clock input signal from oscillator 36 causes terminal A to go high. When both the Q output of flip flop 68 and terminal A are high, AND gate 71 produces the first command clearing shift register 42. The high A output also removes the clear signal which maintains the $\overline{Q}$ output of flip flop 72 in its high state. Upon release of the clear signal, flip flop 72 is set to respond to the next clock signal from output 77 of oscillator 36 and make $\overline{Q}$ go low. Clock signals reach flip flop 72 and shift register 67 out of phase because they arrive by different paths. The signal to flip-flop 72 passes through inverter 73 while the path to the shift register includes AND gate 74, which also inverts the signal. Consequently, one-half clock cycle after output A goes high releasing the clear signal from flip flop 72, an inverted clock signal reaches flip flop 72 causing $\overline{Q}$ to go low. When $\overline{Q}$ goes low flip flop 68 is cleared, causing the Q output of flip flop 68 to go low which ends the CLEAR SHIFT REGISTER command. During the time interval when $\overline{Q}$ is low and the B output of shift register 67 is low, both signals combine at AND gate 75 to produce the second sequence command CLEAR SHIFTS COUNTER, which clears counter 48. The low $\overline{Q}$ signal also provides the preset signal to shift register 42, thereby giving the third sequential command. The next clock pulse from oscillator 36 causes the high output of shift register 67 to shift from A to B. When A goes low, flip flop 72 is again cleared, causing $\overline{Q}$ to go high and turning off the CLEAR SHIFTS COUNTER and PRESET SHIFT REGISTER commands. When B goes high clock signals to shift register 67 are temporarily suspended the clock signals instead passing through AND gate 76 to provide the SHIFT commands. Each clock pulse from oscillator 36 is transmitted to input 44 of shift register 42 as a SHIFT command and also to counter 48 as described above. SHIFT signals continue to be repeated until a STOP SHIFTING command is received at input 65 from either one detector 46 or counter 48. A STOP signal enters AND gate 78 which turns off the output of AND gate 76 and reestablishes the clock signal path to shift register 67 by way of AND gate 74. The next clock cycle causes the C terminal to go high and the B terminal to go low. The C terminal generates the LOAD command which transfers the digital values in the ten most significant locations in shift register 42 to latch 52 and the count in counter 48 to latch 53. The next clock cycle causes terminal D to go high and C to go low. Terminal D generates no signals and merely provides a pause in the sequence of commands. On the next clock cycle terminal E goes high giving the final CLEAR COUNTER command to counter input 66, resetting counter 40 to zero.

Fewer than 20 oscillations of oscillator 36 are required for sequence generator 34 to complete the command sequence described above. Because oscillator 36 operates at a frequency 20 times higher than output 37 of divider 38 there can be no significant loss of timing pulses reaching counter 40 during analysis. In the unlikely event that a single clock pulse is recorded by counter 40 before it is cleared but after shift register 42 has been preset, the error introduced is minimal. Moreover, it is corrected upon completion of the next fractional rotation of shaft 10.

The preferred method therefore begins with a twenty-bit number in counter 40 equaling the total number of clock cycles from divider 38 within a quarter-turn of shaft 10. That twenty-bit number is then transferred to shift register 42. The shift register is caused to shift the bits therein to adjacent positional locations of higher significance in increments of one positional location until the most significant bit reaches the most significant location. When dealing with binary numbers composed only of ones and zeros this means shifting the bits until a 1 appears in the most significant location. Counter 48 maintains a count of the number of incremental shifts accomplished during the shifting process. The shifting process automatically moves the ten most significant bits into the ten most significant locations within the shift register. For the purposes of producing a final analog value, the ten least significant locations are simply ignored and only the number value in the ten most significant locations is converted to analog form.

A maximum limit of ten incremental shifts is placed on the shifting process. After ten incremental shifts all of the ten least significant bits originally in counter 40 will be moved to the ten most significant locations in shift register 42. Further shifting will input no additional significant bits into converter 54 so the process is terminated.

In use, the apparatus of the invention serves to continuously monitor the rotational speed of shaft 10. After two tangs 12 have passed the X and Y pickups 14 and 16, the direction of shaft rotation is determined using counters 22 and 24 and comparator 28. Counter 40 continuously accumulates clock pulses from divider 38 and is reset to zero each time a tang passes X pickup 14. Immediately prior to being reset the number in counter 40 is transferred to shift register 42. The twenty-bit count is then processed in the manner described above. Latches 52 and 53 hold the digital values converted by circuits 54 and 58, respectively, until the next tang passes the X-pickup. Those digital values are updated each time a tang passes the X-pickup. When shaft 10 stops, the time between passing tangs becomes large, filling counter 40 which in turn fills shift register 42 and latch 52. When latch 52 is filled, converter 54 produces the minimum value for V1 which is in turn scaled to produce a minimum value for V2 and a minimum or zero reading on meter 61.

In the preferred embodiment means are provided for calibrating and adjusting meter 61. Switch 80 permits the signal from X detector 18 to be replaced by a signal from a calibration clock 82 or an external clock. Clock 82 provides pulses at predetermined intervals representing a specific shaft speed to which meter 61 or buffer circuits 62 are adjusted to correspond. An external clock may also be used if full scale calibration or high accuracy is desired.

As an example of the method and apparatus of the invention, assume shaft 10 is rotating at 1 r.p.m. and the following number appears in counter 40 at the completion of a quarter turn of the shaft:

| Least Significant Location (LSL) | Most Significant Location (MSL) |
|---|---|
| ↓ | ↓ |
| 0 0 0 0 0 0 0 0 1 1 | 1 0 1 1 1 0 1 0 0 0 |

The above number is decimal 96,000 in binary form. 96,000 cycles of medium clock 38 during a quarter turn of shaft 10 yields a shaft speed of 1 r.p.m.

Acording to the method of the invention the above-noted binary number is transferred to shift register 42. The bits are then shifted to locations of higher significance until a 1 appears in the most significant location. After three incremental shifts the following number will be in shift register 42.

| LSL | MSL |
|---|---|
| ↓ | ↓ |
| 0 0 0 0 0 0 0 0 0 0 | 0 1 1 1 0 1 1 1 0 1 |

This binary number is equivalent to decimal 768,000. The ten most significant bits of the twenty-bit number equal 750. Those ten bits are then transferred to latch 52 and upon conversion by converter 54 yield a shaft rotational speed of 0.125 r.p.m. This number is too small by a factor of 8. Voltage V1, being the analog value for 0.125 r.p.m., is then fed into scaler 58 which increases its value by a factor proportional to two raised to the number of shifts performed in shift register 42. In this example, three shifts have been performed, each shift representing a change in value by a factor of ½. The voltage V1 will therefore be increased by a factor of 8 in scaler 58 to produce V2, having an analog value equaling 1 r.p.m.

In another example, shaft 10 is rotating at 100 r.p.m. and the count in counter 40 appears below.

| LSL | MSL |
|---|---|
| ↓ | ↓ |
| 0 0 0 0 0 0 1 1 1 1 | 0 0 0 0 0 0 0 0 0 0 |

This is the binary number for a decimal count of 960 cycles during one quarter turn of shaft 10. The number is transferred to shift register 42 as before and upon completion of ten incremental shifts appears as follows:

| LSL | MSL |
|---|---|
| ↓ | ↓ |
| 0 0 0 0 0 0 0 0 0 0 | 0 0 0 0 0 0 1 1 1 1 |

This binary number equals decimal 983,040. The ten most significant locations in the above twenty-bit number have a value of 960. When transferred to latch 52 and converted by converter 54 they produce a voltage V1 proportional to 0.09765625 r.p.m. Because ten incremental shifts were performed within shift register 42 the analog value V1 is too small by a factor of two raised to the tenth, or 1024. After the ten counts in counter 48 are transferred to scaler 58 by way of latch 53, scaler 58 increases V1 by a factor of 1024 to produce V2 which is proportional to the actual speed of 100 r.p.m.

An alternative embodiment of this invention producing an analog value for horsepower is illustrated in FIG. 4. Horsepower is the product of torque and r.p.m., with an appropriate scaling factor dependent on the units desired. This embodiment combines analog voltage V2, produced by the above-described method, and an analog voltage proportional to the torque of shaft 10, $V_{Torque}$. The resulrant voltage is proportional to shaft horse power. A suitable apparatus for supplying $V_{Torque}$ is described in U.S. Pat. No. 3,850,030. Referring to FIG. 4, a suitable voltage multiplier 83 is used to combine $V_{Torque}$ with V2. The resultant analog horsepower value can be displayed on the ship's instrument panel by means of meter 84 in conjunction with appropriate output buffers 85. The horsepower output could also be coupled directly to control apparatus associated with a variable pitch propeller.

Additional changes are possible within the scope of this invention. For example, the counter and shift register could have capacity greater than twenty bits. Likewise, the converter could have an input capacity smaller than ten bits. With either alternative appropriate changes would have to be made in the shifting cycle to supply the most significant bits to the converter. Another alternative would be to permit incremental shifts of the bits in the shift register beyond ten shifts and allow scaler 58 to compensate for the additional shifts.

In another alternative embodiment, the output circuitry of FIG. 2 can be employed to produce an analog horsepower value on meter 61. This is done by supplying the torque voltage $V_{torque}$ instead of $V_{ref}$ to the feedback input of MDAC circuit 55. Instead of producing an output r.p.m. voltage, converter 54 and scaler 58 will serve to adjust $V_{torque}$ by an amount proportional to shaft r.p.m. to produce an output voltage proportional to horsepower. MDACs such as the AD 7520 accept such analog inputs.

Still another alternative would be to shift the most significant bits in shift register 42 to a position other than toward higher positional locations. The selected bits could be shifted toward the least significant locations, for example, and those bits transferred into latch 52. Appropriate adjustments would then have to be made in the scaling factors applied.

A system and method for producing an analog voltage proportional to shaft rotational speed has been provided. The measurement resolution and accuracy of the system remain high over the entire range of anticipated shaft speeds. In addition, a system and method has been provided for producing an accurate analog measure of horsepower by combining the analog r.p.m. value with an analog torque value.

What is claimed is:

1. A system for measuring the rotational speed of a variable speed shaft comprising: means for sensing at least a predetermined fractional rotation of said shaft; means for supplying an oscillating signal of a predetermined frequency; counter means having a capacity of a predetermined quantity of bits and responsive to said sensing means for counting the total number of cycles of said oscillating signal within the time interval of said predetermined fractional rotation of said shaft; means for selecting a portion of said bits from the number in said counter means, the selected bits being a predetermined number of bits constituting the most significant bits of said number in said counter means; means for determining the position in said counter means of the most significant bit of said selected bits; and digital to analog converter means responsive to said selected bits and the position of said most significant bit for producing an analog output inversely proportional to said number in said counter means to provide an analog measure of shaft rotational speed.

2. A system as in claim 1 in which said digital to analog converter means includes first converter means producing a first voltage inversely proportional to the number value of said selected bits, and scaling means for adjusting said first voltage by an amount proportional to said position of said most significant bit.

3. A system as in claim 2 in which said counter means has a capacity of twenty bits and said selected bits comprise the ten most significant bits of said number in said counter means.

4. A system as in claim 1 in which said means for selecting a portion of said bits includes shift register means into which said bits forming said number in said counter means are transferred, said shift register means having means for shifting the positional location of said bits in increments of one positional location until the most significant bit reaches a predetermined positional location; and shift counting means for counting the number of said incremental shifts accomplished to determine the position of said most significant bit.

5. A system as in claim 4 in which said predetermined positional location is the most significant location in said shift register means and in which said incremental shifts in said shift register means serve to shift the bits to locations of more significant bits.

6. A system as in claim 4 in which said digital to analog converter means includes first converter means producing a first voltage inversely proportional to the number value of said selected bits, and scaling means for adjusting said first voltage by an amount proportional to the number of said incremental shifts counted by said shift counting means.

7. A system as in claim 6 further comprising storage means for receiving said selected bits from said shift register means, said first converter means being responsive to the number value of the bits stored in said storage means.

8. A system as in claim 1 in which an analog input voltage is input to said system and scaled by said analog measure of shaft rotational speed, said digital to analog converter means including means for adjusting said analog input voltage by an amount inversely proportional to the analog value of said selected bits.

9. A system as in claim 8 together with means for producing an analog torque voltage proportional to the torque of the shaft, said means for adjusting said analog input voltage receiving and adjusting said analog torque voltage by an amount inversely proportional to the analog value of said selected bits whereby the analog output produced is proportional to shaft horsepower.

10. A system as in claim 1 together with means for producing an analog torque value proportional to the torque of the shaft, further including multiplier means for combining the analog measure of shaft rotational speed with said analog torque value to produce an output proportional to shaft horsepower.

11. A system for measuring the rotational speed of a variable speed shaft comprising: means for sensing at least a predetermined fractional rotation of said shaft; means supplying an oscillating signal with a predetermined frequency; counter means having locations for twenty bits responsive to said sensing means for counting the total number of cycles of said oscillating signal within the time interval of said predetermined fractional rotation of said shaft; shift register means for selecting the ten most significant bits in said counter means, said shift register means having a capacity of twenty bits into which said bits in said counter means are transferred, and means for shifting the positional locations of said bits in increments of one positional location until the most significant bit reaches the most significant location in said shift register means thereby positioning the ten most significant bits in the ten most significant locations in said shift register means; shift counting means for counting the number of said incremental shifts accomplished; and digital to analog converter means for producing an output voltage proportional to shaft rotational speed including first converter means producing a first voltage inversely proportional to the number value of the bits in the ten most significant locations in said shift register means, and scaling means for adjusting said first voltage by an amount proportional to the number of said incremental shifts counted by said shift counting means.

12. A system as in claim 11 further including means for determining the direction of rotation of said shaft.

13. A method for measuring shaft rotational speed using an oscillator which supplies a signal of a predetermined frequency and binary counter means, comprising the steps of: causing said binary counter means to count the total number of cycles of said oscillating signal within at least a predetermined fractional rotation of the shaft; selecting a portion of the bits from the number in said binary counter means, the selected bits being a predetermined number of bits constituting the most significant bits of said number in said binary counter means; determining the position in said binary counter means of the most significant bit of said selected bits; and converting said selected bits and the position of said most significant bit into an analog output inversely proportional to the number in said binary counter means to provide an analog measure of shaft rotational speed.

14. The method of claim 13 in which said converting step includes producing a first voltage inversely proportional to the number value of said selected bits, and scaling said first voltage by an amount proportional to the position of said most significant bit.

15. A method for measuring the rotational speed of a variable speed shaft using an oscillator which supplies a signal of a predetermined frequency, binary counter means, and shift register means, comprising the steps of:

causing said binary counter means to count the total number of cycles of said oscillating signal within at least a predetermined fractional rotation of the shaft; transferring the bits in said binary counter means to said shift register means; causing said shift register means to shift the positional locations of said bits in increments of one positional location until the most significant bit reaches a predetermined positional location whereby a most significant portion of bits are moved to predetermined locations in said shift register means; counting the number of said incremental shifts accomplished; producing an analog value inversely proportional to the number value of said most significant portion of bits; and scaling said analog value by an amount proportional to the number of said incremental shifts counted.

16. The method of claim 15 including the step of adjusting the output produced in the last-named scaling step by an amount proportional to the torque of the shaft to produce an analog output proportional to shaft horsepower.

17. A method for measuring the rotational speed of a variable-speed shaft using means for sensing at least a predetermined fractional rotation of said shaft, an oscillator which supplies a signal of a predetermined frequency, binary counter means and shift register means each having locations for twenty bits, and digital to analog converter means, comprising the steps of: causing said binary counter means to count the total number of cycles of said oscillating signal within at least a predetermined fractional rotation of the shaft; transferring the bits in said counter to said shift register means; causing said shift register means to shift the positional locations of said bits to positions of more significant bits in increments of one positional location until the most significant bit reaches the most significant location whereby the ten most significant bits are moved into the ten most significant locations in said shift register means; counting the number of said incremental shifts accomplished; causing said digital to analog converter means to produce a first analog voltage inversely proportional to the number value stored in the ten most significant locations in said shift register means, and scaling said first analog voltage by a factor proportional to the number of said incremental shifts counted to produce an analog output voltage proportional to shaft rotational speed.

* * * * *